May 15, 1928.
E. G. TEMPLETON
1,669,634
TRIMMING DEVICE FOR TIRE BUILDING MACHINES
Filed April 12, 1926
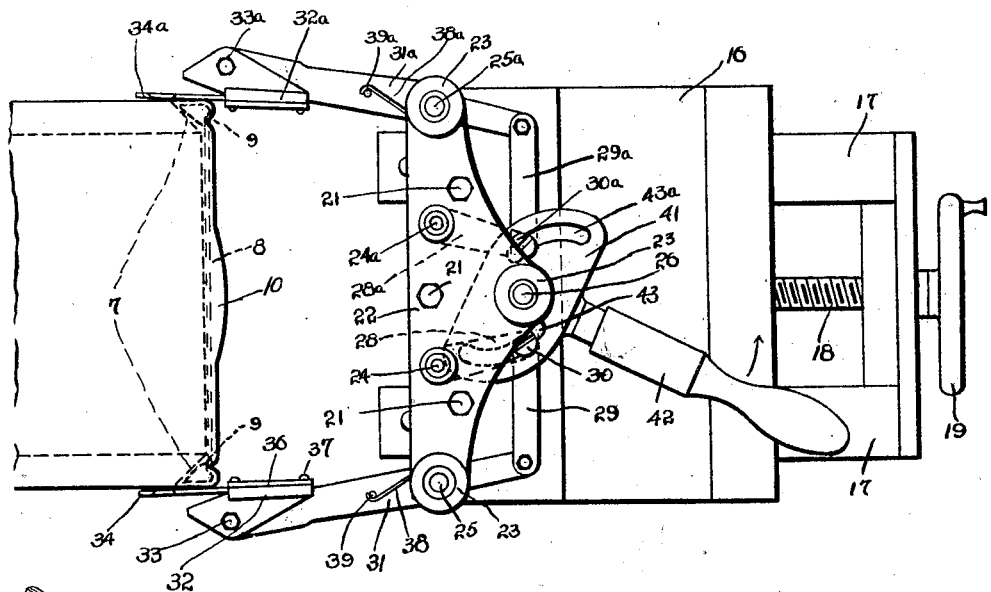
Inventor
Edwin G Templeton.
By R. S. Trogner
Attorney Patented May 15, 1928.

1,669,634

UNITED STATES PATENT OFFICE.

EDWIN G. TEMPLETON, OF AKRON, OHIO, ASSIGNOR TO THE GOODYEAR TIRE & RUBBER COMPANY, OF AKRON, OHIO, A CORPORATION OF OHIO.

TRIMMING DEVICE FOR TIRE-BUILDING MACHINES.

Application filed April 12, 1926. Serial No. 101,343.

My invention relates to tire building machines, and it has particular relation to that portion of machines of the above-designated character, which is employed to trim off the excess marginal material of the fabric reinforcing medium of tires constructed thereon.

One object of my invention is to provide a mechanical device which will obviate the manual trimming operation that has characterized the methods of building tires which have been employed heretofore.

Another object of my invention is to provide a trimming mechanism for drum built tires, which is capable of more rapidly performing the operation for which it is designed, while at the same time the resultant product is of more uniform quality than has been possible of attainment by present day practice.

According to the so-called "drum built" method of fabricating tires, a plurality of plies of rubberized fabric and a set of beads are superimposed about a drum, after which chafing strips, and a tread are applied in order. It is impractical, in preparing the stocks that are employed, to cut them with that degree of precision which would obviate a marginal excess when superimposed about the drum. On the other hand, to retain this excess material would render the bead portion of the tire too bulky and irregular.

The drum upon which the tires are assembled is as a rule of collapsible construction and, often times, the several segments that constitute it do not meet in exact alignment. According to former methods of trimming the excess material, the builder employs a hand tool, which he holds against the edge of the rotating drum. In the event the respective circumferential edges of the segments of the drum are not flush with each other the unaligned or offset portions thereof are likely to strike the trimming tool and cause injury to the workman. This is particularly true if the drum is rotating rapidly. According to my invention these difficulties are obviated as will be evidenced by referring to the description and accompanying drawings in which;

Fig. 1 is a plan view of a trimming device, embodying the principles of my invention, in engagement with the edge of a drum; and Fig. 2 is an elevational view of the device illustrated in Fig. 1.

A tire building machine includes, among other elements, a mandrel 5, which is rotatably mounted in a frame (not shown) wherein it is driven from a suitable source of power. Juxtaposed to the drum is a turret 6, upon which are mounted certain instrumentalities that the builder employs during the tire fabricating operation. In the drawings only that portion of a drum and turret is illustrated which is necessary to a full and complete understanding of my invention.

The drum is provided with beveled edges 7 and has superimposed upon its periphery a tire assembly that is ready for the trimming operation. Among the elements constituting the assembly are a plurality of plies of rubberized fabric 8, a set of beads 9 that have been tied in by the marginal portion of the fabric, and a tread portion 10. The excess portion 11 of the plies of fabric is permitted to extend beyond the edge portion of the drum, where it may readily be severed.

The turret includes a reciprocable base plate 16, which is in slidable engagement with a pair of stationary guide members 17. The base is reciprocated by rotating a threaded shaft 18, which is housed in the stationary portion of the turret and which is in engagement with the plate 16. A hand wheel 19 is secured to one end of the shaft to facilitate the rotatory movement.

A plurality of spacing pins 21, which are secured to the base plate, support a crown plate 22 that is parallel to the base plate. The crown plate includes a plurality of bossed portions 23 which are aligned with complementary boss portions 23ª on the base plate. These serve as journals for stud shafts 24, 25 and 26.

The construction of two oppositely disposed trimming mechanisms is identical. For this reason, only one of them need be described. The corresponding elements of the other mechanism are designated in each instance by the suffix "a". The mechanism includes an arm 28, one end of which is pivoted upon the stud shaft 24, whereas the other end is pivotally joined to one end of a link 29 by a pin 30 having an elongate head portion. The other end of link 29 is, in turn, pivotally joined to one end of a lever 31 fulcrumed upon the stud shaft 25. A knife holder 32 is attached to the other end of the lever by a nut and bolt 33, whereby it may be adjusted to any convenient angle with respect to the drum. A V-shaped knife member 34 is mounted in the knife holder wherein it is secured by a face plate 36 and screws 37. The lever 31, together with the knife holder 32, is urged in the direction of the complementary knife holder by a spring 38, which surrounds the stud shaft. One end of the spring is secured to the crown plate 22; the other end engages a short lug 39 upon the lever. A plate member 41, which has a handle 42 secured thereto, pivots about the stud shaft 26. It is provided with a pair of cam slots 43 and 43ª which engage the extended portions of the pins 30 and 30ª.

To operate the trimming device, the handle is moved in the direction indicated by the arrow, thereby spreading the knife members. Subsequently hand wheel 19 is rotated in the proper direction to move the base plate into proximity with the drum. After the V-shaped portions of the knife members have been brought into line with the edge of the fabric projecting beyond the edge of the drum, the rotation of the hand wheel is interrupted and the cam member 41 is swung upon its pivot to operate the arms 31 and 31ª to bring the knives into engagement with the edges of the rotating drum. After a single revolution of the drum, the trimming operation will have been completed. The knife members are then separated, after which they are withdrawn by reverse rotation of the screw member 18.

By practising the principles of my invention, the dangers that have accompanied the trimming operation in the past are obviated. The manipulation of the device is exceedingly simple and is inducive to rapidity of operation. Moreover, the elements which constitute the embodiment are of a rigid character and are not susceptible to breakage. It is desirable, of course, that the knives be maintained as sharp as is consistent with operating conditions. By loosening the screws 37, which secure the face plate 36, the knives may readily be removed from the holders and freshly sharpened ones substituted therefor.

Although but a single embodiment of the invention has been disclosed, it will be apparent to those skilled in the art that the invention is susceptible of many modifications which are clearly within the scope and spirit thereof and I desire, therefore, that it be limited only to accord with the prior art and the appended claims.

What I claim is:

1. In a machine for fabricating tires having a rotatable drum and an axial support for the drum, a device for trimming the selvage portions of the tires comprising a pair of knives having V-shaped notches, individual lever members for supporting the knives, and manually operated cam means adapted to pivot the lever members to bring the knives thereon into engagement with the edge of the drum.

2. In a machine for fabricating tires, a cylindrical drum, a slidable support adjacent the drum, a swingable supporting arm mounted on the support, a knife mounted on the arm, a link pivoted to the arm, a second link pivoted to the first mentioned link and pivoted to the slidable support, and a cam member pivoted to the support and having a cam slot in engagement with the pivotal connection of the two links and a handle for operating the cam member.

3. In a machine for fabricating tires, a cylindrical drum, a slidable support adjacent the drum, a pair of swingable arms mounted on the support, knives mounted on the arms and adapted to engage the ends of the drum, links pivoted to corresponding ends of the arms, second links pivoted to the support and also to the first mentioned links, and a cam member pivoted on the support between the arms and having cam slots engaged with the pivotal connections between the first and second mentioned sets of links.

4. In a machine for fabricating tires a cylindrical drum, a slidable support adjacent the drum, a pair of swingable supporting arms mounted on the support, knives mounted on the arms and adapted to engage the ends of the drum with their edges transversely disposed with respect to the edges of the drum, links attached to the arms, second links pivoted on the support and attached to the first mentioned links, and a cam member pivoted upon the support and having cam slots in operative engagement with the pivotal connections between the first and second mentioned links.

5. A tire building machine comprising a rotatable cylindrical drum, a turret positioned exteriorly of the drum, a pair of supports secured to the turret, a cutting member secured to each support with its edge contacting with the end of the drum and extending transversely thereof, and means to actuate the cutting members simultaneously toward or away from the drum.

6. A tire building machine comprising a rotatable cylindrical drum, a turret positioned exteriorly of the drum, a pair of supports pivoted to the turret, a cutting member secured to each support with its edge contacting with the end of the drum and extending transversely thereof, and means to actuate the cutting members simultaneously toward or away from the drum.

7. A machine for fabricating tires comprising a rotatable cylindrical drum, a device for trimming the edge portions of a tire mounted upon the drum comprising a pair of cutting members having notches formed in their cutting edges and mountings for the cutting members operable to bring the cutting edges into contact with the ends of the drums.

8. A machine for fabricating tires comprising a rotatable cylindrical drum, a device for trimming the edge portions of a tire mounted upon the drum comprising a pair of cutting members having notches formed in their cutting edges and mountings for the cutting members operable to bring the cutting edges into contact with the ends of the drum, said means comprising a base, arms pivoted to the base and secured to the cutting members, and means to operate the arms simultaneously to cause the cutting members to contact with the ends of the drum.

In witness whereof, I have hereunto signed my name.

EDWIN G. TEMPLETON.